(12) United States Patent
Kingsbury et al.

(10) Patent No.: US 7,712,358 B2
(45) Date of Patent: May 11, 2010

(54) TESTING COMPONENTS OF DRIVE TRAINS

(75) Inventors: Richard G. Kingsbury, Liss (GB); John R. White, Southhampton (GB)

(73) Assignee: Geo Kingsbury Machine Tool Limited, Gosport (GB)

( * ) Notice: Subject to any disclaimer, the term of this patent is extended or adjusted under 35 U.S.C. 154(b) by 506 days.

(21) Appl. No.: 11/729,091

(22) Filed: Mar. 27, 2007

(65) Prior Publication Data
US 2007/0240517 A1 Oct. 18, 2007

(30) Foreign Application Priority Data
Mar. 31, 2006 (GB) ................... 0606557.7

(51) Int. Cl.
*G01M 15/00* (2006.01)
(52) U.S. Cl. .................................. 73/115.06
(58) Field of Classification Search ....................... None
See application file for complete search history.

(56) References Cited
U.S. PATENT DOCUMENTS 3,754,437 A    8/1973  Kanbel
4,033,042 A    7/1977  Bently
5,477,740 A   12/1995  Shioya
6,389,888 B1 *  5/2002  Juranitch et al. ......... 73/116.01
2005/0081644 A1  4/2005  Juranitch et al.

FOREIGN PATENT DOCUMENTS

DE    19826526 A1    12/1999

* cited by examiner

*Primary Examiner*—Robert R Raevis
(74) *Attorney, Agent, or Firm*—Courtney Staniford & Gregory LLP

(57) ABSTRACT

A drive line (A) for testing a component (D) of a drive train of a vehicle comprises a torque sensor. The torque sensor measures AC variations in torque due to the operation of the component (D). The component (D) is coupled to the drive line by an adapter having a coupling for coupling the drive line to the axle. The torque sensor may output both AC and DC components of measured torque variation. A servo controller controls the drive line so that the drive line is driven into abutment with the axle and then backed off by a small preset distance.

14 Claims, 17 Drawing Sheets

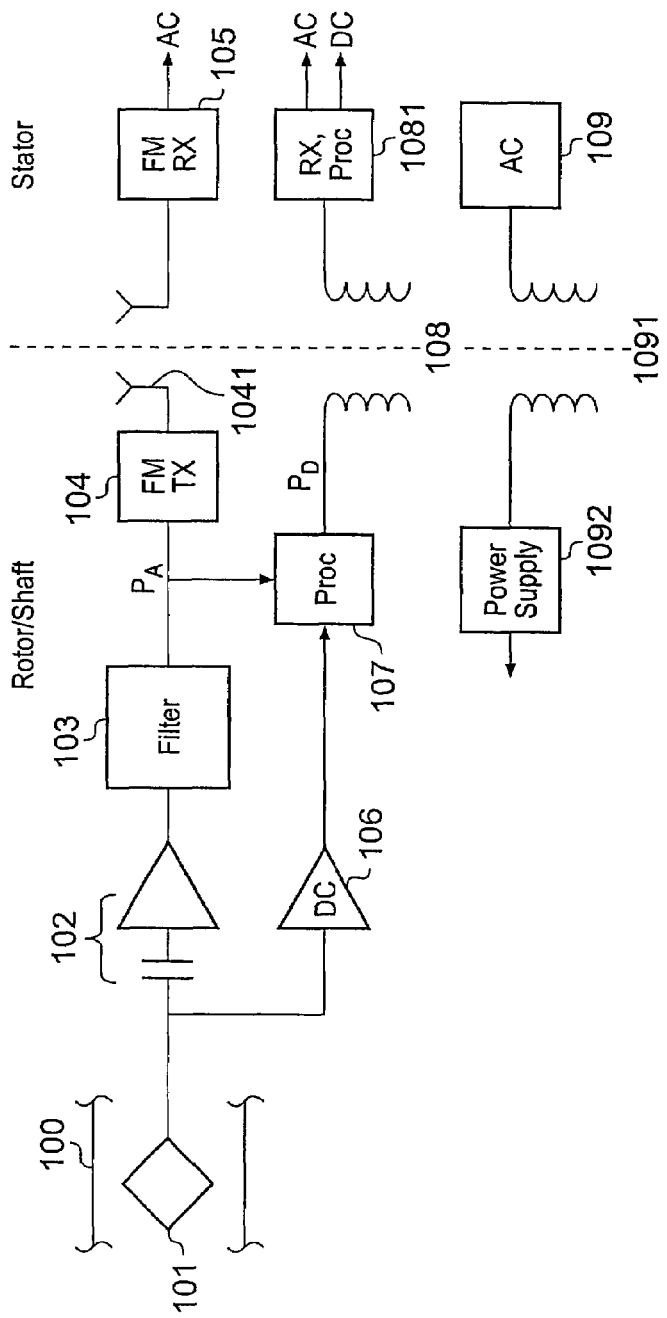
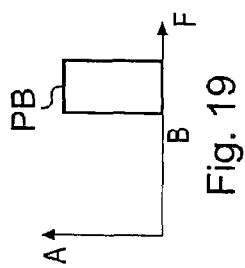
Fig. 19
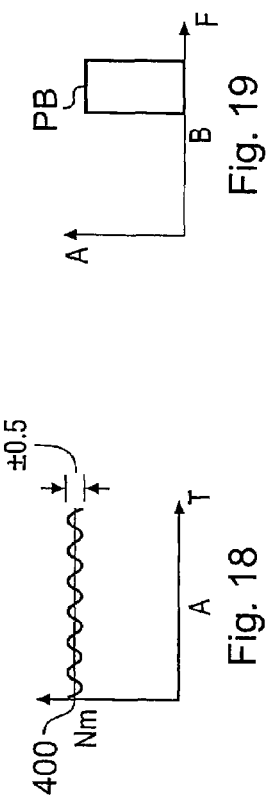
Fig. 17
Fig. 18

TESTING COMPONENTS OF DRIVE TRAINS

RELATED APPLICATIONS

The current application claims priority under 35 U.S.C. §119(a-d) or 35 U.S.C. §365(b) to United Kingdom Patent Application 0606557.7, filed on 31 Mar. 2006, and entitled "Testing Components of Drive Trains"

FIELD OF THE INVENTION

The present invention relates to apparatus for, and a method of, testing a component of a drive train of a vehicle. In the following an example of such a component is an axle including a differential gear assembly but the invention could be applied to other components for example a gear box, or a transfer box of a four wheel drive, amongst other examples.

DESCRIPTION OF THE PRIOR ART

It is known to use a test apparatus for NVH testing of drive train components where NVH indicates Noise, Vibration and Harshness. The testing also tests that the component is functional; e.g. the elements of the component such as gears and bearings are not jammed. Various NVH testing techniques have been proposed. In one technique an array of microphones is used to monitor noise output whilst the component is driven by for example an electric motor which also tests the functionality of the component. Another technique uses accelerometers to detect vibration. Another uses a laser vibration detector. Each of these techniques provide results of varying reliability and repeatability.

A technique used by the present Applicants since about July 2004 will now be described by way of example to the accompanying FIGS. 1, 2, 3 and 4 in which.

Figure 1:
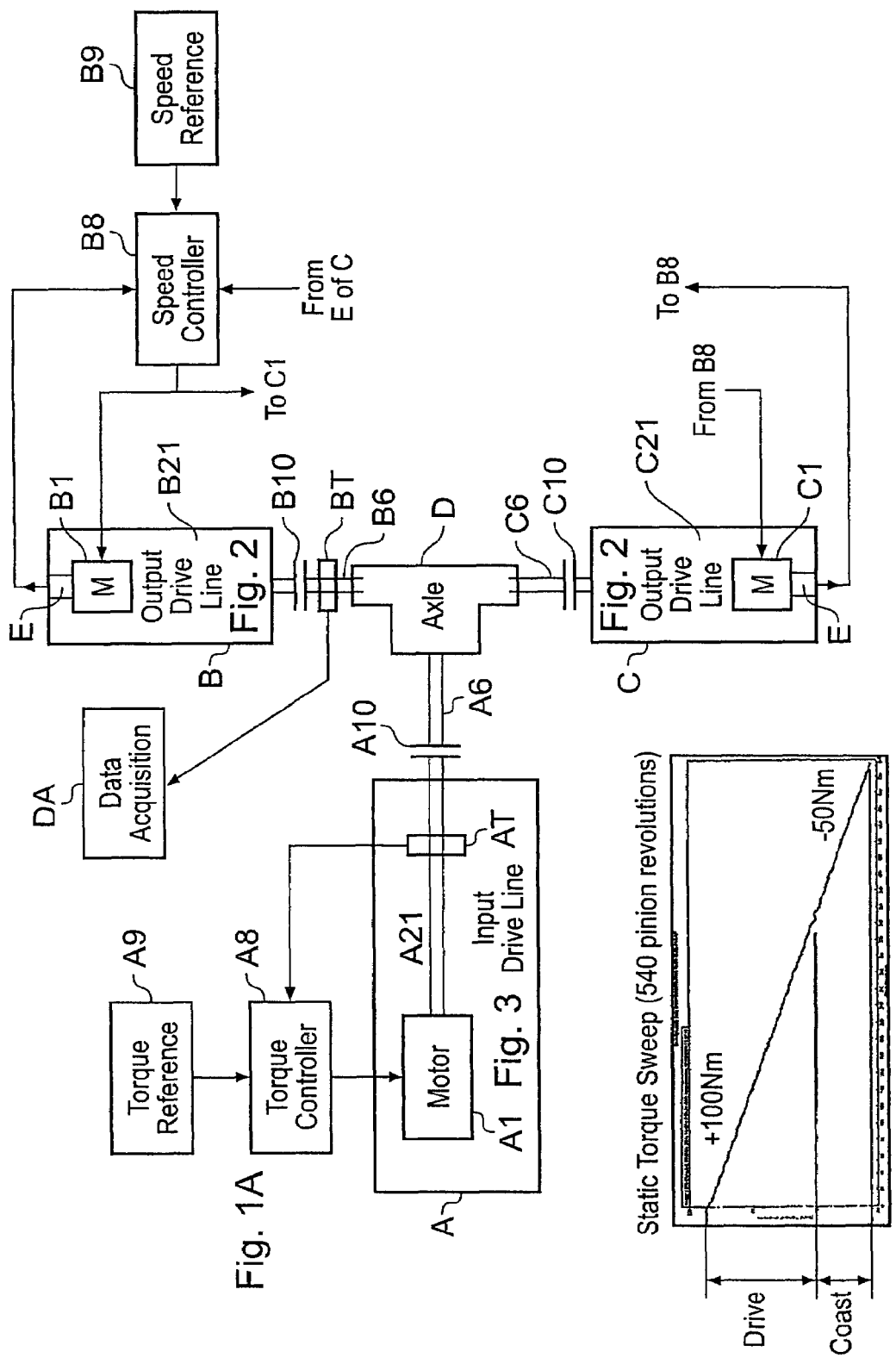
FIG. 1A is a simplified schematic plan view of a known test apparatus.
FIG. 1B is a graph showing a variation in static (DC) torque.
Figure 2:
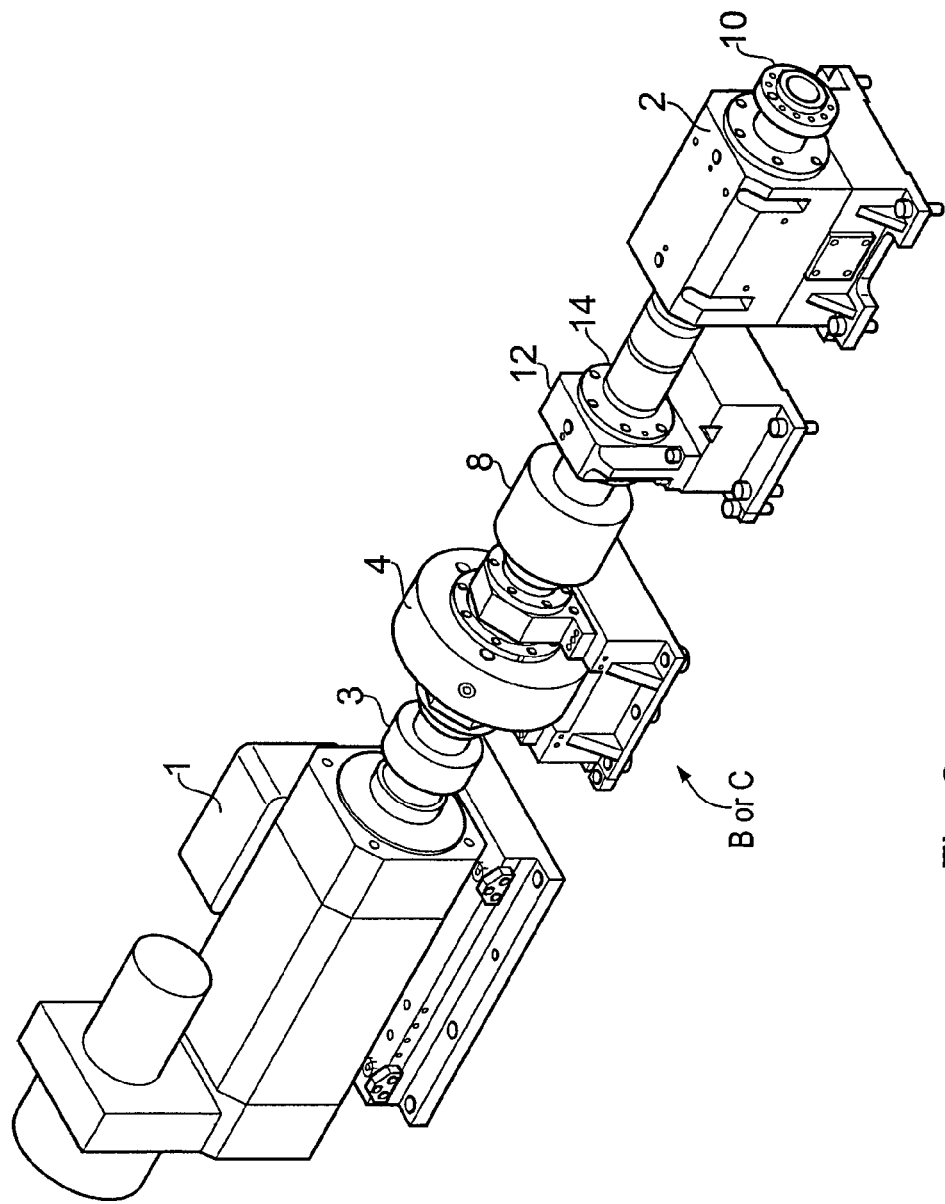
FIG. 2 is a perspective view of an output drive line of the apparatus of FIG. 1.
Figure 3:
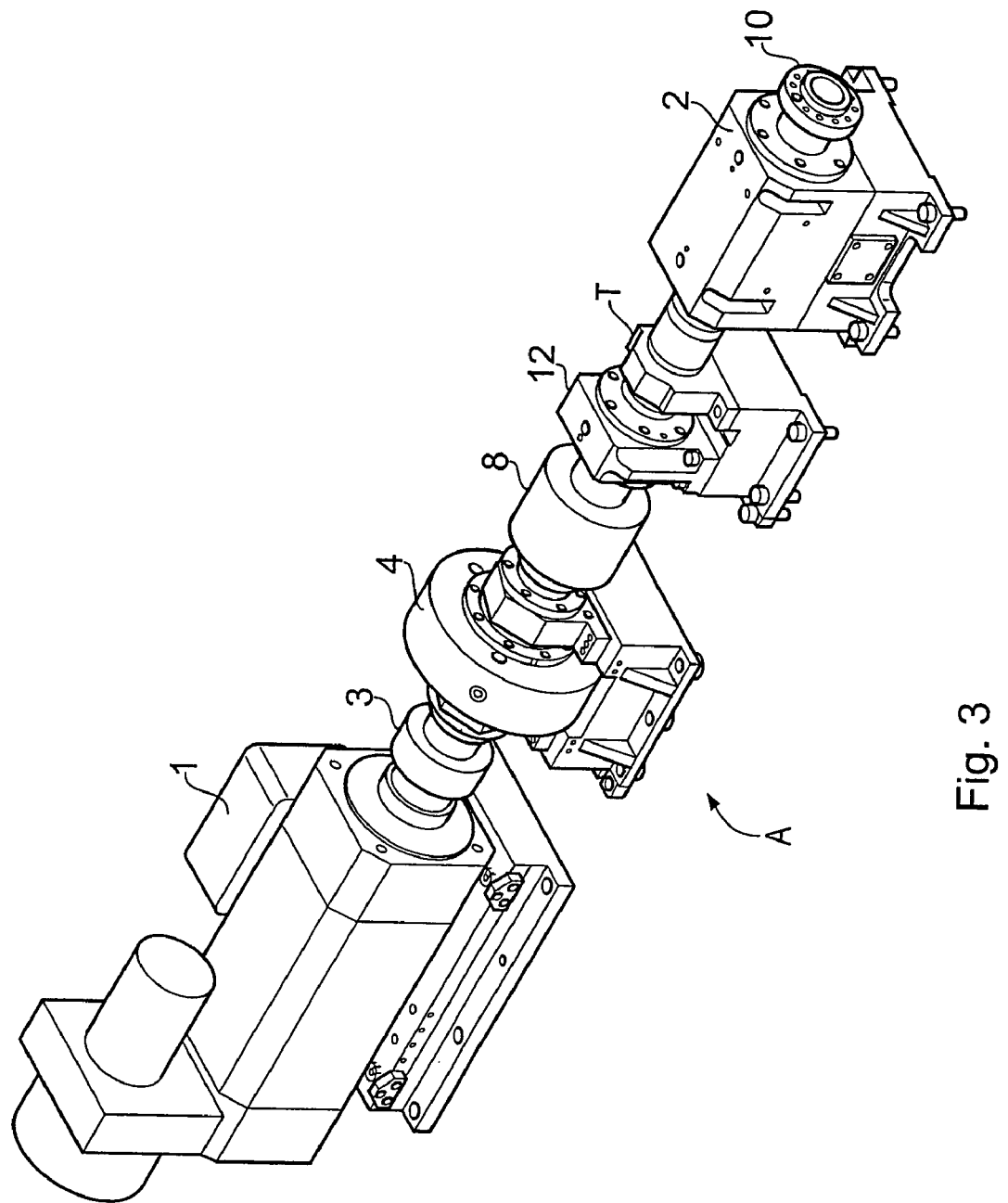
FIG. 3 is a perspective view of an input drive line of the apparatus of FIG. 1.

Referring to FIG. 1, the test apparatus comprises 3 drive lines A, B and C of which drive line A is an input drive line and lines B and C are output drive lines. An example of the output drive line is shown in FIG. 2. An example of the input drive line is shown in FIG. 3. Each drive line comprises a motor A1, B1, C1 coupled by other drive line components A21, B21, C21 (illustrated schematically) forming a shaft arrangement to component D under test via an adapter A6, B6 and C6. The adapters connect the drive lines to respective shafts of the component D. The component under test in this example is an axle of a vehicle. Drive line A mimics the engine of a vehicle and drive lines B and C mimic the drive wheels of the vehicle which may be front or rear wheels. Adapter B6 is instrumented in that it has a torque sensor BT for detecting AC torque variations on the axle of the component under test. The sensor BT is connected to a data acquisition device DA which records the signal produced by the sensor BT for analysis by a signal processor which is not shown. The adapters A6 and C6 are plain adapters (i.e. they are not instrumented).

Motors B1 and C1 of the output drive lines B and C are controlled to drive the axles of the component under test at a fixed speed whilst a torque which varies in a predetermined manner is applied by the input drive line A to the component under test.

The input drive line A includes a DC torque sensor AT (an example of which will be described in more detail below) on the shaft arrangement A21 of the drive line: i.e. it is not on the adapter A6. The DC torque sensor AT feeds back to a torque controller A8 a measure of the torque applied by the drive line to the component D under test. The controller A8 compares the fed back torque measurement with a reference torque produced by a reference source A9 to control the motor A1. The reference source causes the torque to vary in a predetermined manner and the torque controller 8 cause the torque applied by the drive line A to vary in the predetermined manner to a precise tolerance.

The motors B1 and C1 of the output drive lines B and C are controlled by a speed controller B8 which controls both motors to run at the same speed. Each motor has an encoder E which feeds back to the controller B8 the speed of the motor. The fedback speed information is compared in the speed controller B8 with a speed reference produced by a speed reference source B9 and the motors are controlled accordingly in conventional manner.

Each drive line is mounted on a slide (not shown) to bring the adapter into engagement with a shaft of the axle D. The purpose of the adapters A6, B6, C6 is to provide a member which fits both the drive line and the particular model of axle under test. Different models may require different adapters A6, B6, C6.

In an example of a test procedure in which the component under test is an axle containing a differential, the output motors B1 and C1 of the drive lines B and C drive the output shafts of the differential at constant speed whilst the input motor A1 of the drive line A applies a load torque which varies linearly, as shown in FIG. 1B, from a positive maximum value (i.e. the input motor is trying to drive the output shafts of the differential in the same direction as the output motors) to a negative maximum value (i.e. the input motor is trying to drive the output shafts of the differential in the opposite direction to the output motors. The test has a duration of a preset number of shaft rotations (e.g. 540) in order to gather sufficient data.

Referring to FIG. 2, an example of the output drive line B or C is shown in more detail. The motor 1 is coupled via a flexible coupling 3 to a flywheel 4. The flexible coupling damps unwanted variations in output torque of the motor. The flywheel is coupled to a safety clutch 8. The clutch has an output shaft coupled to a spindle of a spindle assembly 2 via a spacer 14. One end of the spacer is connected to the output shaft of the clutch and is supported by an intermediate bearing 12. The spindle assembly 2 is coupled to the component under test, in this example an axle containing a differential gear assembly D, via an adapter (not shown). The adapter is connected to the drive line by a connector 10 which is shown as a flange but may have any other suitable form. The components 3 to 10 effectively form a shaft arrangement which connects the motor to the adapter.

In the case of drive line B, the drive line is connected to the axle by an instrumented adapter B6.

The instrumented adapter B6 comprises a torque sensor T an example of which will be described in more detail below.

The output drive line C is identical to the drive line of FIG. 2 but it is connected to the axle via an adapter C6 which is a plain, uninstrumented, adapter.

An example of the input drive line A is shown in FIG. 3. The drive line A is identical to the drive line of FIG. 2 except it is connected to the axle via a plain uninstrumented adapter A6 and the DC torque sensor AT (shown as T in FIG. 3) is mounted on the drive line in place of the spacer 14.

The DC torque sensor AT of the input drive line A may be for example an RS 420 sensor available from Datum Electronics, Ryde, Isle of Wight, PO33 2BE, United Kingdom. It comprises a rotor on which are mounted strain gauges and signal processing circuits, a stator and an interface which inductively transfers power from the stator to the rotor for powering the circuits and transfers processed signals from the strain gauges to the stator. The torque transducer AT of the input drive line produces a digital signal. The sampling rate is about for example 1 KHz. That relatively low sampling rate limits the drive line rotational speed at which it is possible to gather data samples of the ac torque fluctuations.

Figure 4:
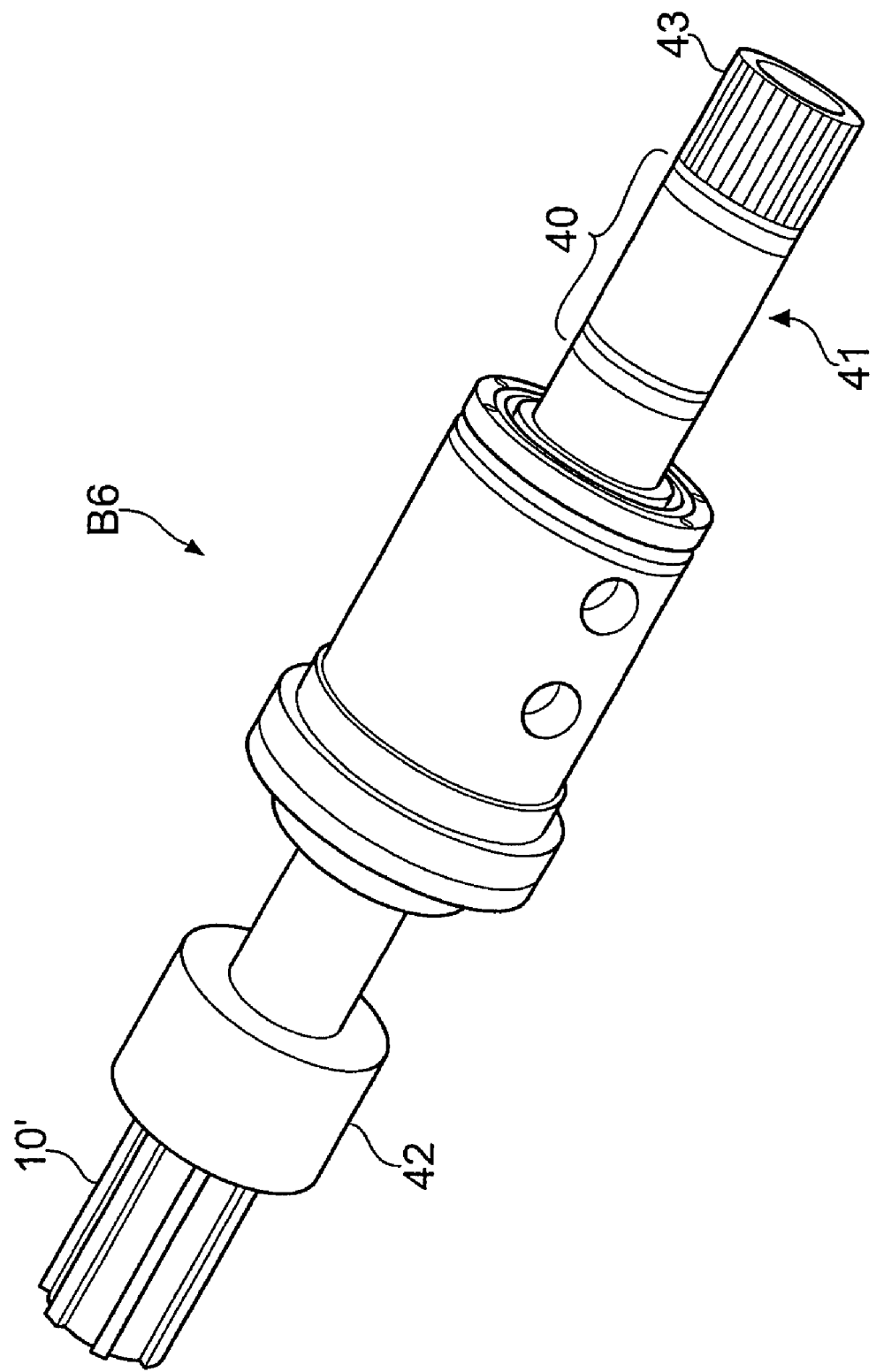
FIG. 4 is a view of an instrumented adapter used with one of the output drive lines of FIG. 1.

An example of the instrumented adapter B6 of the output drive line B is shown in FIG. 4. The adapter has a spline 43 for engaging a corresponding spline in the shaft of the axle under test. This example is for connecting to a differential gear assembly in the axle D. The adapter is a hollow shaft having a section 40 of reduced outside diameter on which are mounted strain gauges. The section has a protective cover 41. The strain gauges are mounted on the section of reduced outside diameter which is positioned to be as close as possible to the crown wheel of the differential in the axle. Digital signal processing circuits mounted on, or inside, the adapter interface 42 are connected by internal wires to the strain gauges. The adapter interface 42 cooperates with a stator (not shown) to receive power from the stator and to transmit digital signals representing the torque measured by the strain gauges to the stator. The interface is an inductive coupling for, at a minimum, power transfer. The signals may be transferred inductively or by an RF link. The torque sensor, the signal processor and the interface are available from Datum Electronics, Ryde, Isle of Wight, PO33 2BE, United Kingdom.

As described above, the torque transducer BT is mounted on the adapter B6 so that it is as close as possible to the crown wheel of the differential of the axle under test. The purpose of the torque transducer BT is to detect AC variations in torque originating from the operation of the component under test as close as possible to the source of the variations so as to be substantially uninfluenced by the components of the drive line.

In some versions of the test apparatus, an AC torque sensor is place in both the input drive line and either one or both of the output drive lines.

As described above, each drive line is mounted on a slide and is driven along the slide into and out of engagement with the shaft of the axle by an electric motor controlled by a servo controller. The servo controller drives the drive line to a predetermined position at which the adapter is engaged with the axle.

The apparatus is trying to detect AC variations in torque as representing NVH values of the axle. Such AC variations are very small compared to the "DC" torque applied to the axle, for example plus or minus 0.5 Nm in a "DC" torque which may be 400 Nm or more and varying over a range of +400 Nm or more to −50 Nm or less. Furthermore it is essential, if tests are to be meaningful, that they are consistent over tests of many nominally identical axles.

It is assumed for the purpose of testing that all AC torque variations originate only in the component (axle) under test. However, the test apparatus is large and complex with many mechanical components, electro-mechanical components and electronic components any of which can influence the results. For example resonance in a drive line may be detected as a torque variation. Minor variations in the torque of the motors A1, B1 and CI could be detected as NVH torque variations. Inaccuracies in the dimensions of mechanical components could provide sources of error. Other potential sources of error include the torque sensors themselves. For example the torque sensors are designed to reject frequencies which coincide with resonance in a drive line. The values of passive electronic components may drift with time and active components may be subject to other uncertainties which could affect the results of tests. These are only a few examples of potential sources of error in these large and complex machines which combine: high precision mechanical engineering: high precision electronic sensing of very small AC torque variations with very small signal to noise ratio; complex signal processing; and control of the machine.

SUMMARY OF THE INVENTION

The invention seeks to provide a test apparatus, and a method of testing, which provides consistent results. Manufacturers of drive train components wish to test the components for NVH. They need to have confidence that the test results are meaningful and accurate to avoid rejecting good components and accepting bad components. They set criteria for test machines, for example:

1) repeated tests of the same component on the same test machine should produce consistent results within a tolerance band;

2) if a test machine has two or more NVH sensors they should produce consistent results when testing the same component; and 3) repeated tests of the same component on different examples of the same type of test machine should produce consistent results within a tolerance band. Even if a test machine provides results which comply with such criteria, it is desirable to reduce variations and the tolerance band.

The present inventors have investigated variations in test results on repeated tests of the same axle on the same machine, the machine being similar to the machine described above. Also, in an example of the test, the test machine had two torque sensors, one on each of the output shafts and the outputs of the two sensors were different. The inventors investigated these variations and differences in detail, trying to locate the source of them including the sources discussed above. One source of variance between sensors, and/or between tests which was considered, was jitter in the mechanical couplings between the adapters and the component under test. The inventors investigated whether the source of the differences in the AC signals detected by the sensors was play in the splines of the adapters and the output shafts of the axle. However by using adapters designed to very tightly fit the output shafts, it was found that was not the source of error.

An input shaft of an example of an axle has a circular flange about the shaft. The flange has four (or more) bolt holes. In the prior art testing machine, the adapter for coupling thereto has a similar flange with projections which project into the holes in the flange of the axle, The drive line is driven to the predetermined position in which the projections of the adapter engage in the holes in the flange, being aligned with the holes. In an experiment, the inventors bolted the adapter of the input drive line to the input shaft of the axle and surprisingly found that the variations between sensors on one test, and variations between tests were much reduced. However, it is not practical to bolt the adapter of the input drive line to each axle to be tested because, amongst other criteria, throughput of the testing apparatus is very important. Saving even one second or less for each test of an axle is significant when testing tens of thousands of axles per year.

According to one aspect of the present invention, there is provided apparatus for testing a component of a drive train of a vehicle, the apparatus comprising an output drive line for connection to an output of the component, an input drive line for connection to an input of the component, the input and output drive lines being arranged to test the component with a predetermined combination of drive speed and torque.

wherein each of the input and output drive lines has a coupling for engaging with a corresponding coupling of the component and each of the drive lines is mounted for movement into and out of engagement with the component, the coupling of one of the input and output drive lines having a radially facing engagement surface and an axially facing reference surface, the engagement surface of the coupling of the drive line being for engaging with a corresponding radially facing engagement surface of the component the coupling of the component having an axially facing reference surface, and a controller arranged to move the said one of the drive lines towards the component so that the engagement surfaces of the coupling and component engage, with their reference surfaces spaced by a predetermined amount, and to initiate testing of the component whilst maintaining the said engagement and the said predetermined amount of spacing.

Figure 5:
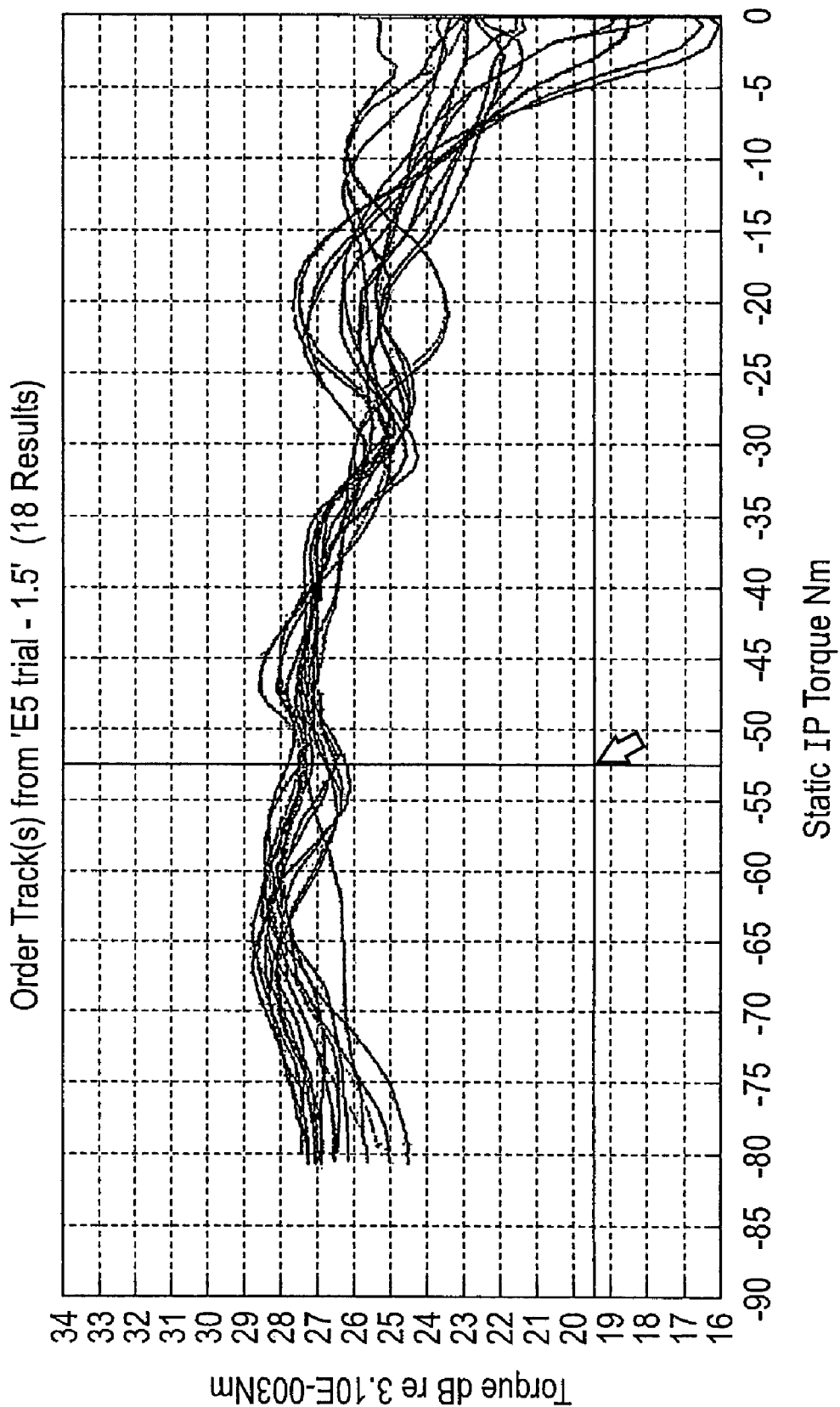
Figure 6:
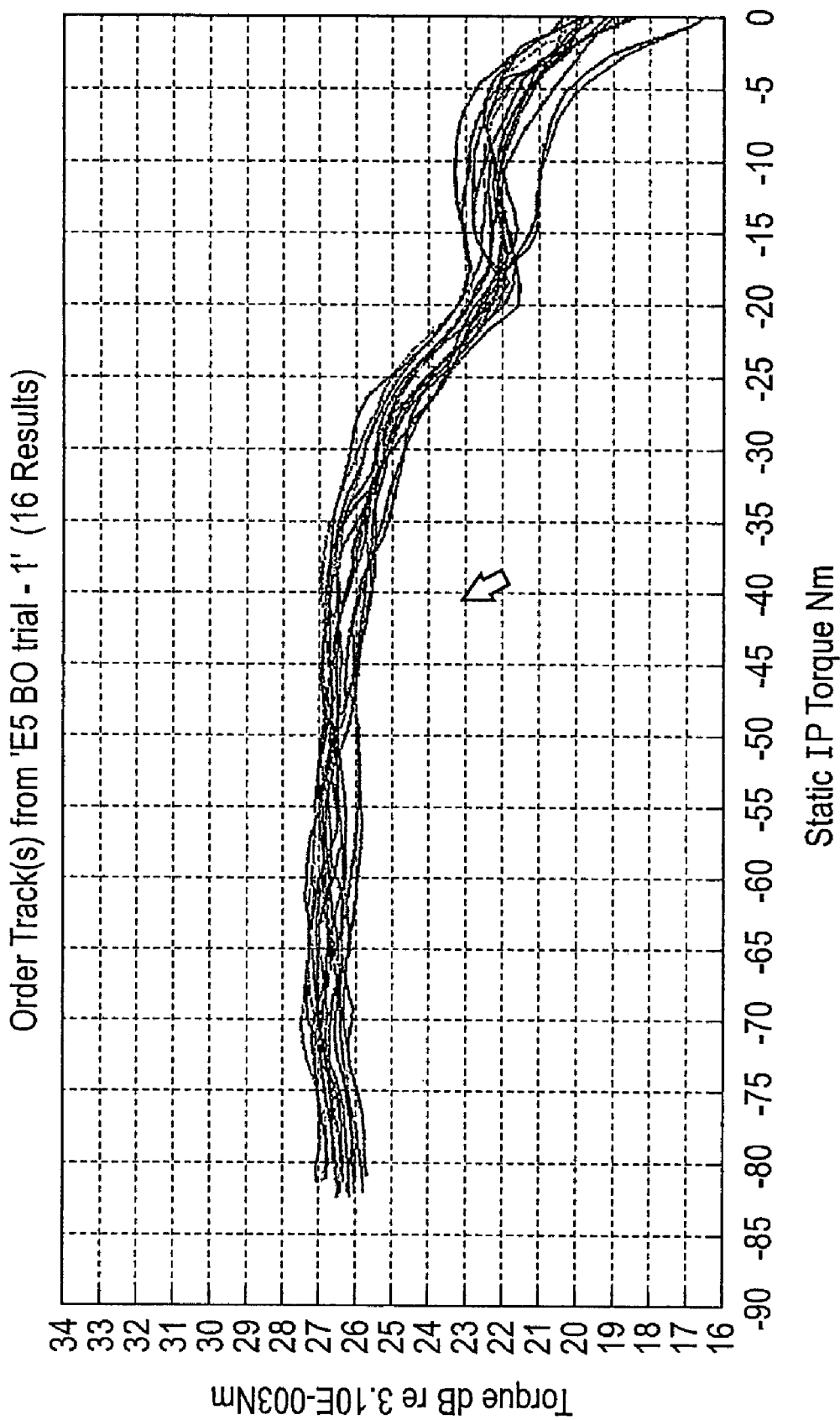

By choosing the appropriate spacing of the reference surfaces, the variations between sensors on one test and between successive tests are at least greatly reduced as shown by way of example in FIGS. 5 and 6.

FIG. 5 is an example of test results produced in the course of the investigations which shows that, over a range of variation of input torque, repeated tests have results spread over 3 dB or more. In FIG. 5, input torque is varied over a range −90 Nm to 0 Nm for a spacing of the said reference surfaces of 1.5 mm. The test machine had two torque sensors, one on each output shaft, indicated as RHOP and LHOP. FIG. 6 shows for the same tests with a chosen spacing of the reference surfaces of 0.1 mm that the inconsistencies are eliminated over most of the range of variation of torque in that the results are within a tolerance of 1 dB to 2 dB. (It is accepted in the art that around 0 Nm torque, the tests produce unreliable results.)

With the prior art testing apparatus, the drive line is driven to a predetermined position at which the adapter engages the axle on the assumption that the axle dimensions are correct. It has been found, unexpectedly, that variations in the dimensions of axles significantly affect the results of the test. It has been found that because of such variations in the dimensions of the axles, driving the drive line to a predetermined position results in different spacings of the reference surfaces of the coupling and the axle.

By moving the drive line into a position in which the reference surfaces have a predetermined spacing, regardless of the actual dimensions of the axles, it has been found that the test apparatus compensates for variations in dimensions of nominally identical axles and produces consistent test results. However as FIGS. 5 and 6 show, the actual spacing itself gives rise to inconsistencies so it is necessary to determine the optimum spacing which may vary from one type of component to another.

In another aspect of the invention, there is provided a method of testing a component of a drive train of a vehicle, using a test apparatus comprising an output drive line for connection to an output of the component, an input drive line for connection to an input of the component whilst the predetermined torque is applied to the output, the input and output drive lines being arranged to test the component with a predetermined combination of drive speed and torque wherein each of the input and output drive lines has a coupling for engaging with a corresponding coupling of the component and each of the drive lines is mounted for movement into and out of engagement with the component, the coupling of one of the input and output drive lines having a radially facing engagement surface and an axially facing reference surface, the engagement surface of the coupling of the drive line being for engaging with a corresponding radially facing engagement surface of the component the coupling of the component having an axially facing reference surface, the method comprising moving the said one of the drive lines towards the component so that the engagement surfaces of the couplings of the drive line and component engage, with their reference surfaces spaced by a predetermined amount. and testing of the component whilst maintaining the said engagement and the said predetermined amount of spacing.

A method according to said another aspect of the invention, comprises the steps of testing a component with different values of spacing of the reference surfaces of the coupling and component to determine empirically the optimum spacing which provides consistent test results and using the empirically determined value as the said predetermined amount. This enables the optimum value of the spacing to be determined for each type of component to be tested.

In embodiment of the invention the said predetermined amount of spacing is small compared to the axial length of the engagement of the engagement surfaces.

Figure 8:
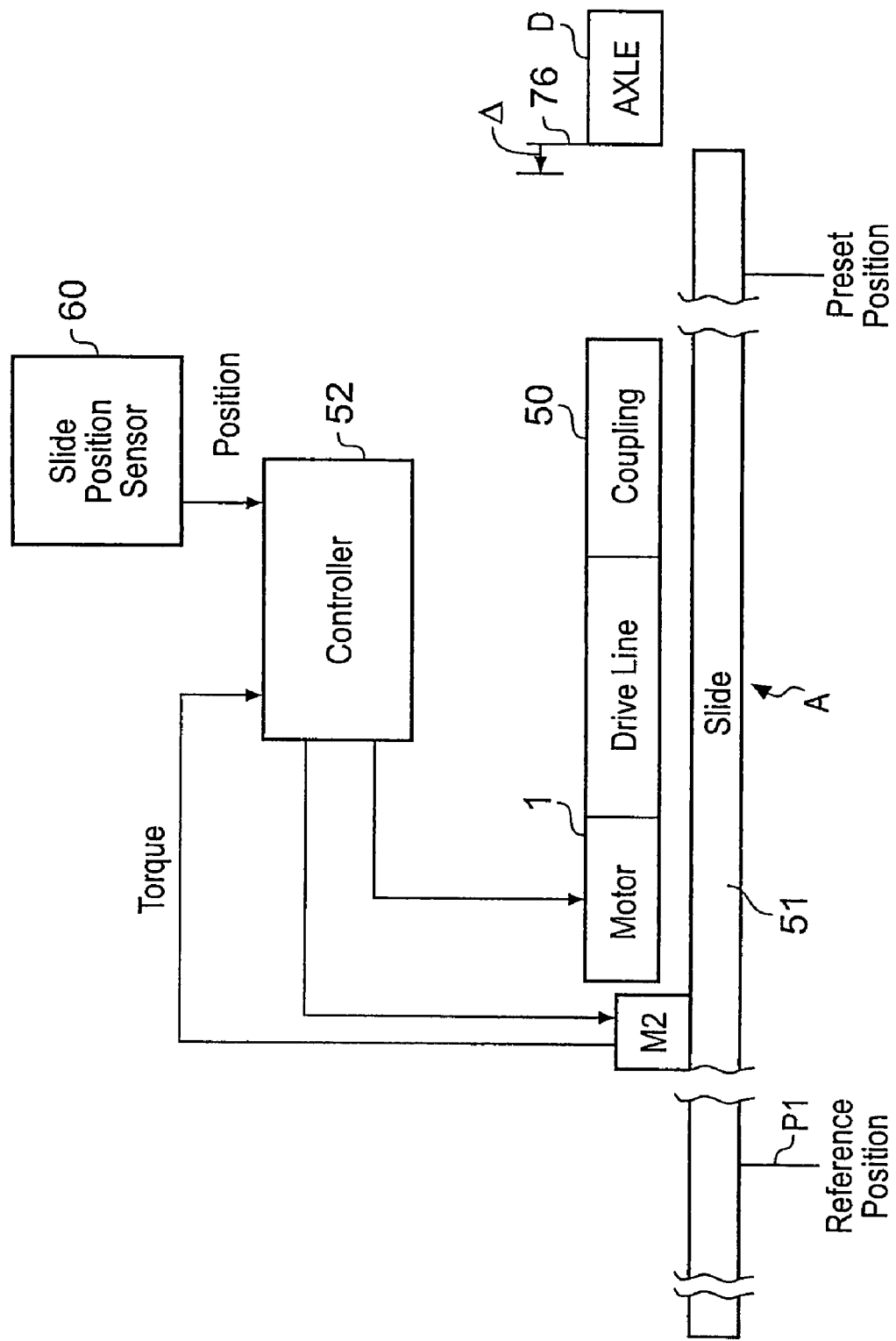
Figure 9:
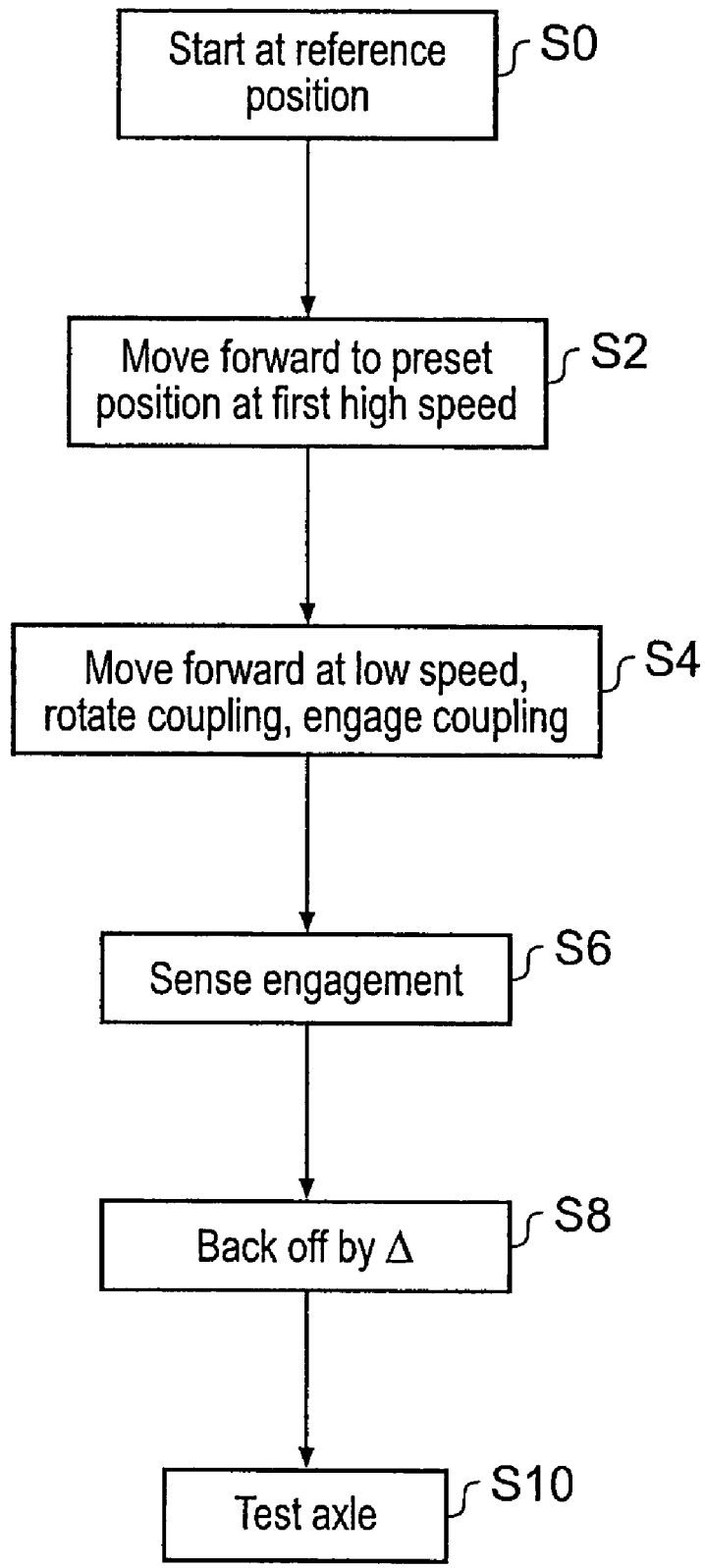

For a better understanding of the present invention, reference will now be made by way of example to the accompanying drawings in which:

FIGS. 1 to 4 show an example of the prior art as discussed above;

FIG. 5 is an example of one set of test results illustrating inconsistencies;

FIG. 6 is an example of another set of test results illustrating the substantial elimination of the inconsistencies;

FIGS. 7A to 7D show in partial cross-section examples of coupling and the corresponding part of an axle;

FIG. 8 is a schematic block diagram of an example of an input drive line in accordance with the present invention;

FIG. 9 is a flow chart illustrating an example of a mode of operation of the drive line of FIG. 8

Figure 10:
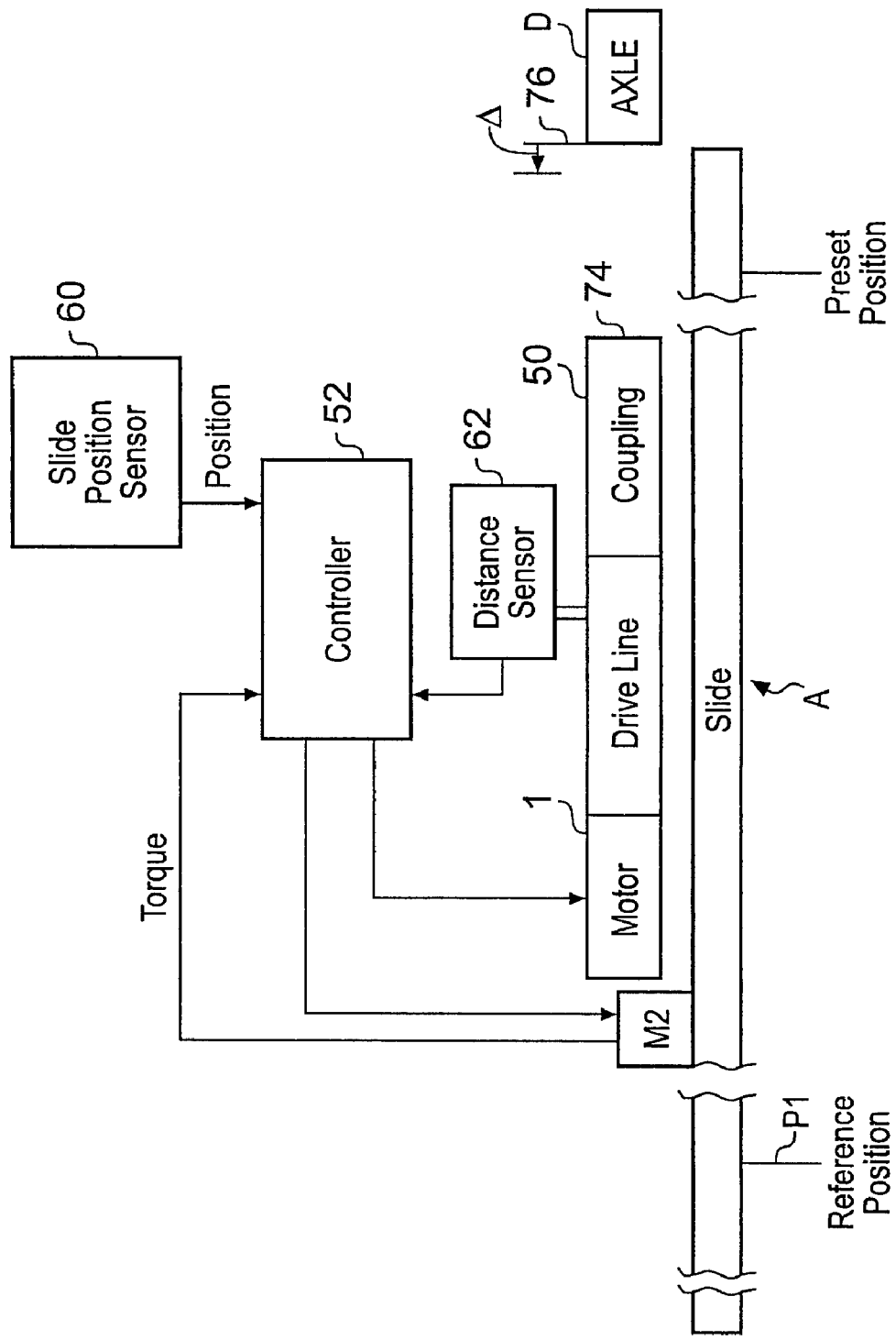
Figure 11:
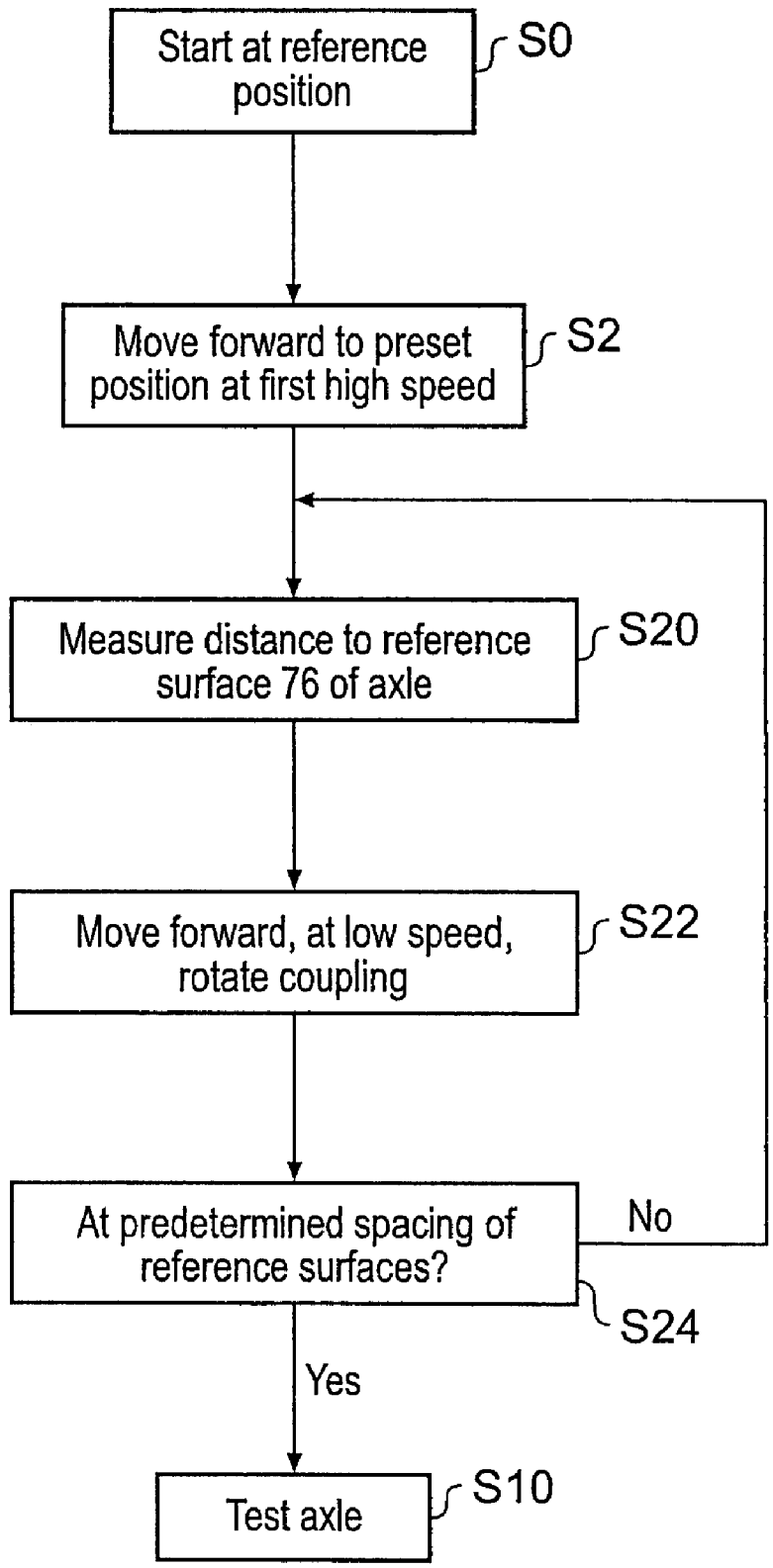
Figure 12:
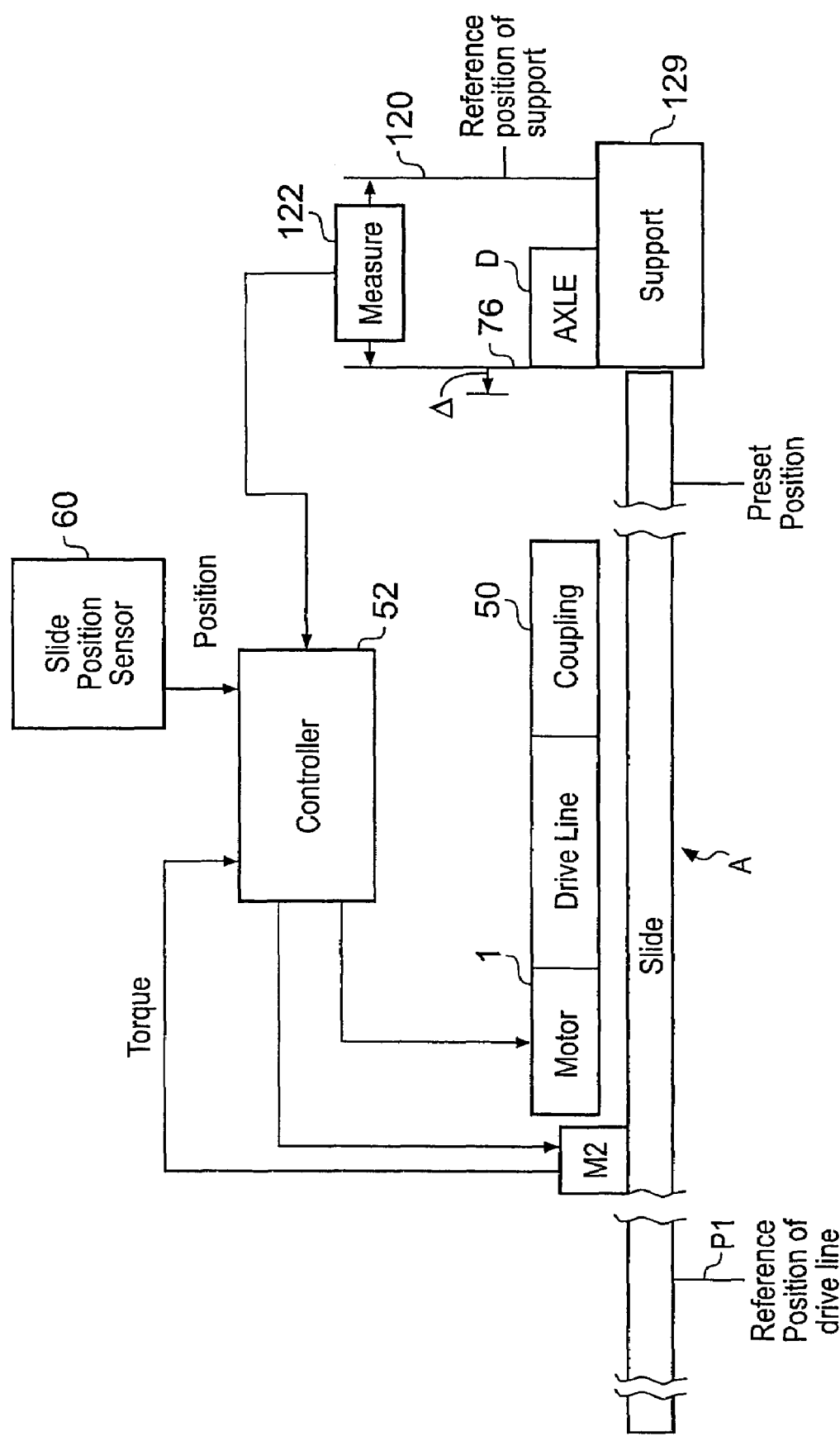
Figure 13:
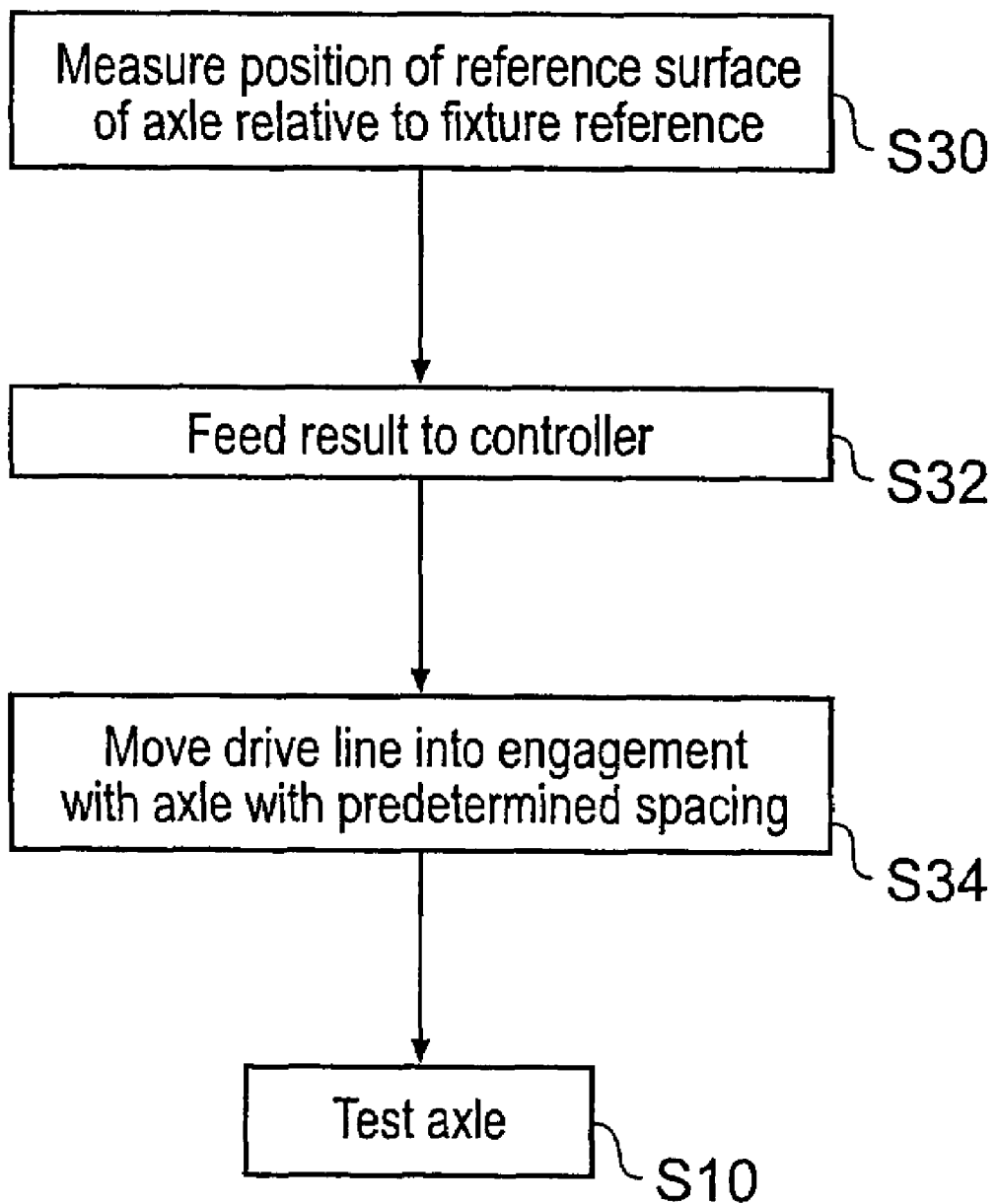
Figure 14:
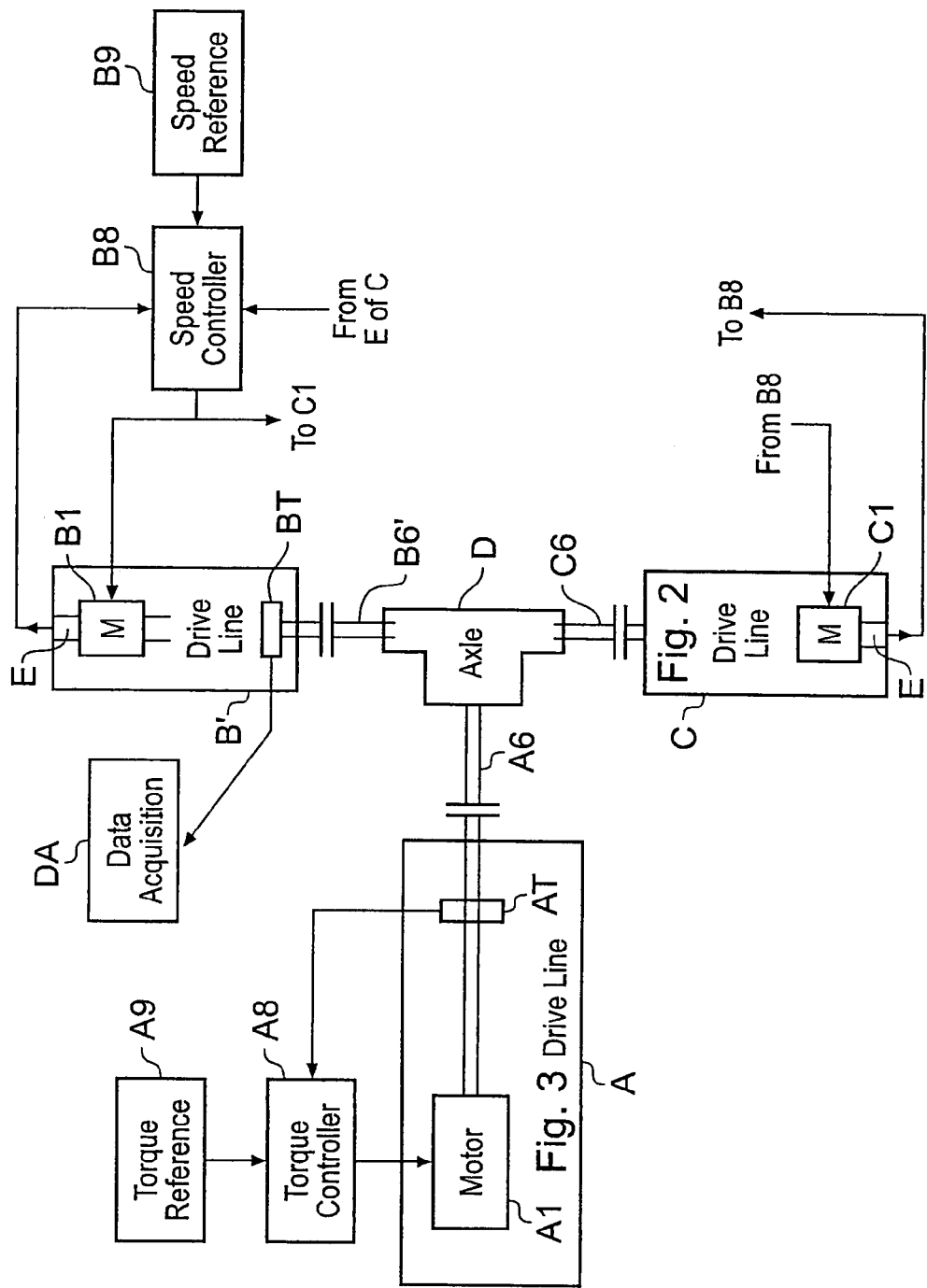
Figure 15:
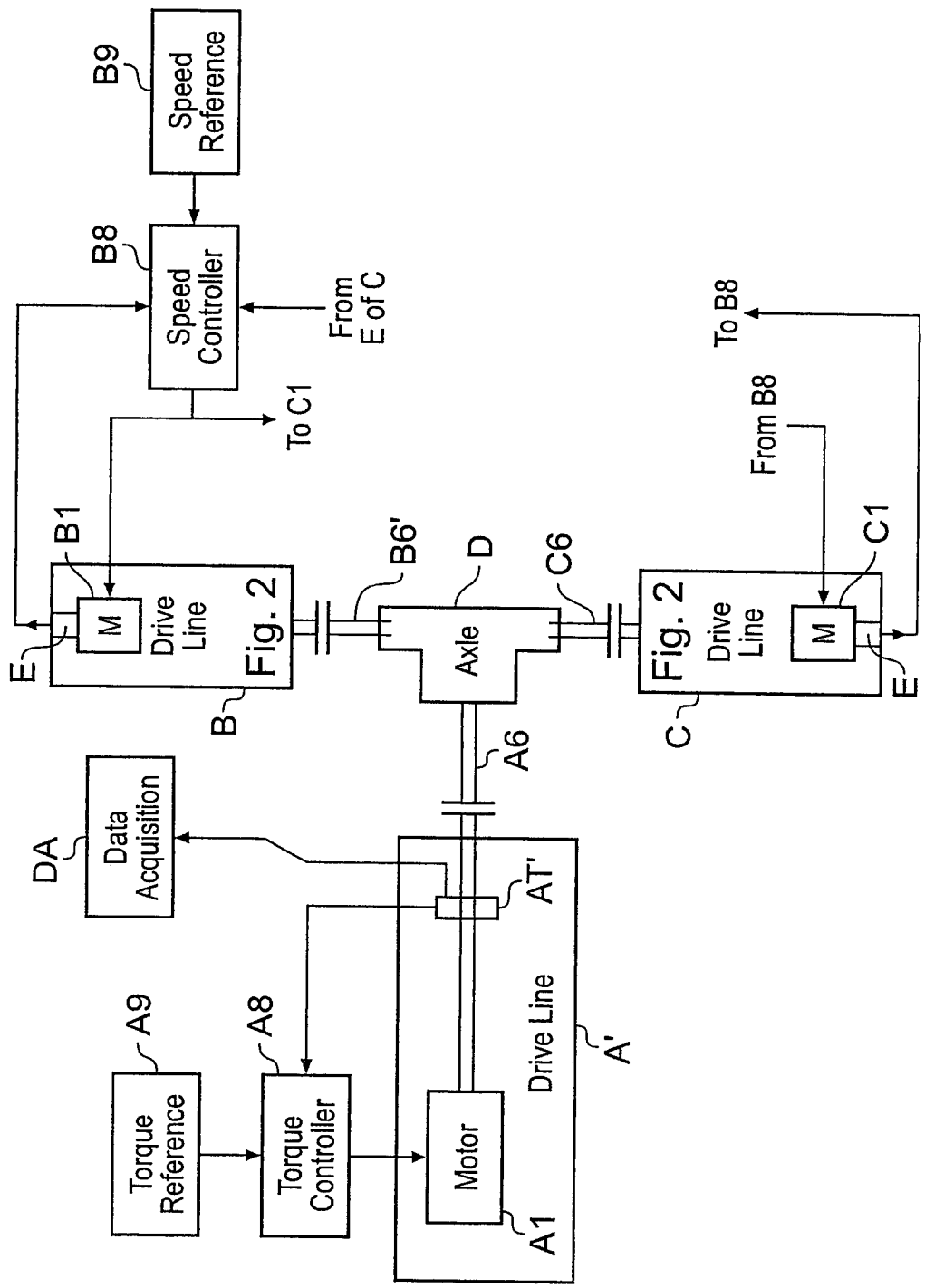
Figure 16:
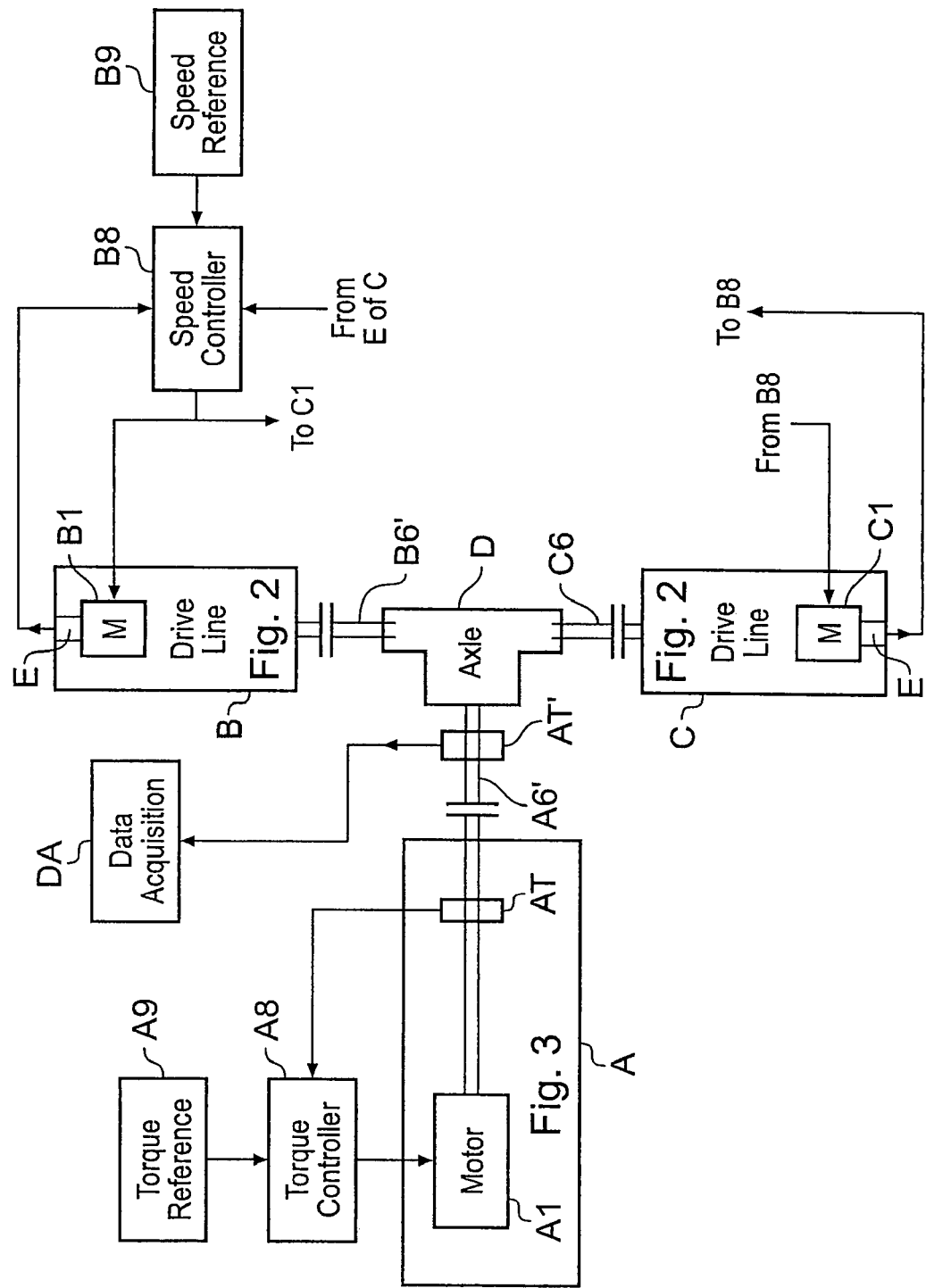

FIG. 10 is a schematic block diagram of another example of an input drive line according to the present invention;

FIG. 11 is a flow chart illustrating a mode of operation of the drive line of FIG. 10;

FIG. 12 is a schematic block diagram of a further example of a further example of an input drive line in accordance with the invention;

FIG. 13 is a flow chart illustrating a mode of operation of the drive line of FIG. 12;

FIG. 14 is a simplified schematic plan view of an example of a test apparatus in accordance with the present invention;

FIG. 15 is a simplified schematic plan view of another example of a test apparatus in accordance with the present invention;

FIG. 16 is a simplified schematic plan view of a further example of a test apparatus in accordance with the present invention;

FIG. 17 is a block diagram of a torque transducer useful in the present invention;

FIG. 18 is a graph showing an AC torque variation on a static torque; and

FIG. 19 is a schematic illustration of a filter pass-band.

FIG. 8

An Example of an Input Drive Line According to the Invention

The input drive line A of FIG. 8 comprises a drive line A as shown in FIG. 3 having amongst other items, the electric motor 1 and a coupling 50 shown in more detail in FIGS. 7A to D. The drive line A is mounted on a carriage, in this case a slide 51 for movement from a reference position p1 towards an axle D and away from the axle D. The drive line is driven along the slide by an electric motor M2. The drive line including the motors 1 and M2 are controlled by a programmable controller 52 which includes the torque reference A9 and the torque controller A8 of the motor 1. The controller 52 receives a signal from a position 60 encoder indicating the position on the slide of the drive line relative to the reference position P1. The controller, amongst other functions, controls: the motors M2 and 1 in dependence on the position of the drive line along the slide; and the motor M2 in dependence on sensed torque of the motor M2 as will be described herein below in more detail.

Figure 7A:
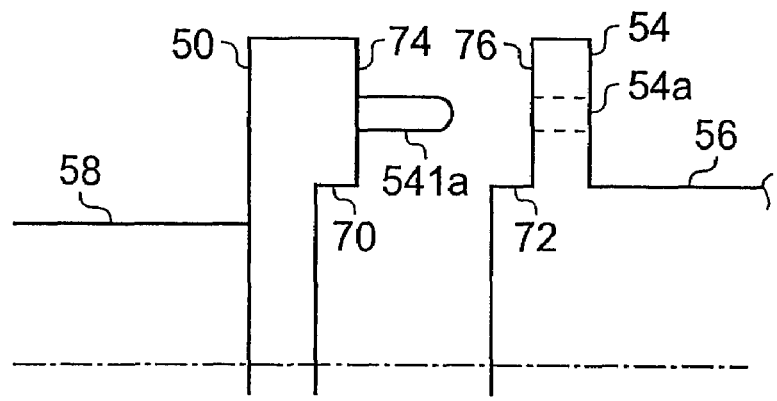
Figure 7B:
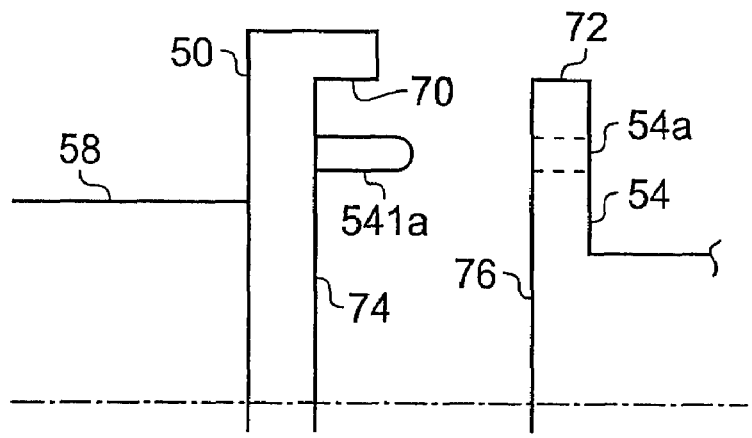

In the example of FIG. 8, the component D to be tested is a differential having in input coupling 54 as shown in FIG. 7A. Referring to FIG. 7A, the coupling 54 comprises a circular flange on an input shaft (56) of the differential. In the example shown the flange has a plurality of bores (only one 54a shown) for bolts which in use of the differential in a vehicle enable the input shaft to be bolted to the drive shaft of the vehicle. In addition it comprises two outer bores (not shown) on a different radius to the other bores 54 and provided for manufacturing purposes.

The coupling 50 of the drive line complements the coupling 54. Referring to FIG. 7A the drive line coupling 50 comprises a circular flange, similar to flange 54, at the end of a shaft 58 which is a shaft of an adapter (not shown). The flange has for example two long, sprung outer projections adapted to fit the two outer bores and four, shorter, fixed projections (one 541a shown) which are adapted to fit the corresponding bores 54a of the axle. In use, the coupling 50 is rotated as it approaches the coupling 54. The spring loaded outer projections, being longer than the fixed projections 541a, contact the flange 54 and are depressed until they encounter the outer bores when they extend into the bores 55 thus aligning the fixed projections 541a with the bores 54a of the axle.

Referring to FIG. 7A, the coupling 54 of the axle has an axially facing reference surface 76 and a radially (outward) facing engagement surface 72 on a male portion of the coupling projecting from the reference surface. The coupling 50 of the drive line has a complementary form having a reference surface 74 and a radially (inward) facing engagement surface 70.

Figure 7D:
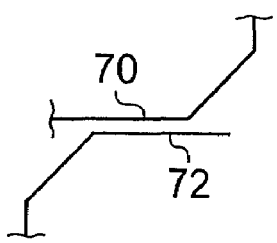

The engagement surfaces 70 and 72 are subject to very close tolerances, being formed with high precision. As shown in FIG. 7D, the leading edges of the engagement surfaces 70, 72 are chamfered.

Figure 7C:
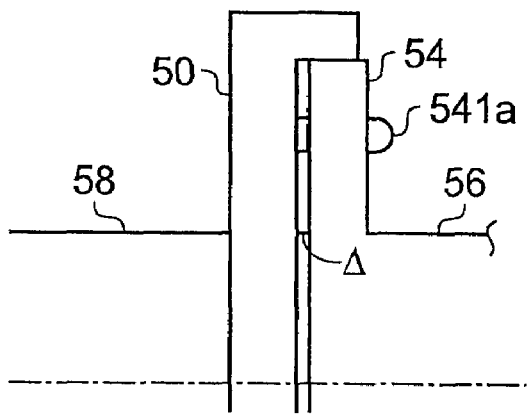

As shown in FIG. 7C the coupling 50 of the drive line engages with the coupling 54 of the axle by the engagement surfaces 70 and 72 engaging. As described below, in accordance with the invention, the reference surfaces 74 and 76 are spaced by a small amount Δ whilst maintaining the engagement of the engagement surfaces.

The amount Δ is small compared to the axial extent of engagement of the engagement surfaces 70, 72.

Such engagement applies substantially no axial force by the drive line on the axle during testing.

In practice the amount Δ is determined empirically, for example as described below, for each type of axle to be tested.

Referring to FIG. 9, the controller 52 is programmed to control the coupling of the drive line to the axle in the following way.

At step S0, the drive line is initially at its reference position.

In step S2, the drive line is moved forward towards the axle D at a predetermined speed, which may be a relatively high speed, until it reaches a preset position in which the coupling 50 is spaced from but close to the flange 54 of the axle.

In step S4 the coupling 50 is rotated as the drive line moves forward at a lower speed to engage the coupling 50 with the coupling 54 of the axle as described above.

In step S6, abutment of the coupling 50 with the coupling 54 is detected by for example monitoring the current of the motor M2. That current will increase because the drive line will stop moving forward because its reference surface 74 has abutted the reference surface 76 of the axle but the motor tries to move the drive line. Abutment may be detected by detecting when the motor current exceeds a preset threshold level.

In step S8 the drive line is backed off from the axle by a preset amount Δ which is small relative to the length of the engagement surfaces whereby the engagement of the engagement surfaces 70 and 72 is maintained as shown in FIG. 7C.

In step S10, the axle is tested as described above for example or as described herein below.

As so far described, the example of the invention uses a test apparatus as described with reference to FIGS. 1 to 4. However the test apparatus may be as described hereinbelow.

Alternative Embodiments of the Invention

Referring to FIG. 10, there is shown a drive line and axle identical to that of FIG. 8 except that the drive line has a distance sensor for measuring the distance from the reference position P1 of the drive line to the reference surface 76 of the coupling 54 of the axle. Thus, the controller 62 calculates the distance it needs to move the reference surface 74 of the drive line coupling 50 so as to engage the engagement surfaces 70 and 72 whilst spacing the reference surfaces by the amount Δ., without needing to drive the reference surfaces into abutment.

FIG. 11 is an example of a flow chart showing a mode of operation of the test apparatus of FIG. 10.

At step S0, the drive line is initially at its reference position.

In step S2, the drive line is moved forward towards the axle D at a predetermined speed, which may be a relatively high speed, until it reaches a preset position in which the coupling 50 is spaced from but close to the flange 54 of the axle.

In step S20, the distance sensor measures the distance to the reference surface 76 and in step S22 the drive line moves forward. In step S24, the controller determines if the drive line has reached the point at which the reference surface 74 of the coupling 50 is spaced by the amount Δ from the reference surface 76 of the axle. If YES, then testing is done at step S10. If NO, then the steps S20 to S24 are repeated.

The distance sensor 62 may be any suitable device. It may be a device based on a camera and image processor or it may be a laser range finder, or any other suitable device.

Referring to FIGS. 12 and 13, the test apparatus is identical to that of FIG. 8 except that the axle is supported on a support 129 (also known as a fixture) which has a reference position 122 at a preset known distance from the reference position P1 of the drive line A. The support 129 carries a device which measures (S30) the distance of the reference surface 76 of the axle to the reference position 120 of the support. That measure is fed (S32) to the controller 52 which then drives (S34) the drive line to a position in which the reference surface 74 of the coupling 50 is spaced by the amount Δ from the reference surface 76 of the axle.

The distance sensor 122 may be any suitable device for example as described above with reference to FIG. 10.

The Predetermined Spacing of the Reference Surfaces.

The predetermined spacing may be established empirically. It has been found that whilst it is fixed for one type of component it varies for different types of component. To determine the optimum value of the spacing, a component is repeatedly tested using different values of the spacing until a spacing is found which provides consistent results according to the relevant criteria such as those discussed hereinabove.

In one example, the spacing is in the range 2.5 mm to 0.1 mm. For one test of one type of axle 0.1 mm provided consistent results Computer Program.

The actual physical apparatus of FIG. 8 is known in the art: likewise for FIGS. 10 and 12 except for the distance sensors. The examples of the invention described above with reference to FIGS. 8, 10 and 12 resides in the manner of controlling the drive line and coupling in accordance with for example the flow chart of FIG. 9, 11 or 13. Thus the invention includes a computer program which when run on the controller causes the apparatus of FIG. 8, 10 or 12 to operate in accordance with for example the flow chart of FIG. 9, 11 or 13 respectively. The computer program may be stored on a suitable medium, for example a disc or be downloaded from a storage device via a communications channel or via a network.

Alternative Test Apparatus.

In this section, there are described the structures of examples of other test apparatus according to embodiments of the invention.

EXAMPLE

FIG. 14

Referring to FIG. 14 the test apparatus comprises an input drive line A identical to the input drive line A described above, an example of which is shown in FIGS. 3 and 8. The apparatus has an output drive line C identical to the output drive line C described above, an example of which is shown in FIG. 2. The apparatus also has an output drive line B' in place of the drive line B described above. The drive line B' differs from the drive line B in that the drive line is connected to the component under test by an adapter B6' which is a plain, uninstrumented, adapter and the torque sensor BT is placed in the drive line. For example the drive line B6' may be as shown in FIG. 3, with the torque sensor BT placed between the intermediate bearing 12 and the spindle assembly 2. In this example of the invention, the torque sensor BT is designed to detect AC variations in the torque which variations are due to the operation of the component under test substantially uninfluenced by the drive line. The torque sensor BT feeds torque signals to the data acquisition device DA.

The torque sensor may be placed elsewhere in the drive line between the flywheel 4 and the spindle assembly 2. The apparatus may also have a complete driveline B' in place of driveline C so that AC torque fluctuations can be measured simultaneously at both outputs of the axle.

A suitable digital torque transducer BT is available from Datum Electronics, Ryde, Isle of Wight, PO33 2BE, United Kingdom. The transducer will be described in more detail hereinbelow.

EXAMPLE

FIG. 15

Referring to FIG. 15, the test apparatus comprises: an input drive line A' different to the drive line A; an output drive line B identical to drive line B described above (i.e. it does not include a torque sensor) an example of which is shown in FIG. 2; and a drive line C identical to drive line C above, an example of which is shown in FIG. 2. Drive lines B and C are connected to the axle D by plain uninstrumented adapters. The drive A' has a torque controller A8 as described above. The drive lines B and C have a speed controller B8 as described above.

Drive line A' is also connected to the axle by a plain adapter. The drive line A' differs from the drive line A in that the DC torque sensor T of drive line A is replaced by a torque sensor AT' which senses both DC torque for feeding back to the torque controller A8 but also AC torque variations due to the component under test. The torque sensor AT' feeds its AC torque signals to the data acquisition device DA. The DC torque signals are fed to the controller A8. A suitable torque sensor is available from Datum Electronics and will be described below in the section headed "Torque Sensors".

EXAMPLE

FIG. 16

Referring to FIG. 16, the test apparatus comprises: an input drive line A identical to the drive line A described above, an example of which is shown in FIGS. 3 and 8, and having a DC torque sensor AT; and output drive lines B and C as described above, examples of which are shown in FIG. 2. The output drive lines B and C are connected to the axle under test by plain adapters. Drive line A is connected to the axle by an instrumented adapter A6' having a torque sensor AT'. An example of the torque sensor AT' is described in the section "Torque Sensors" below.

The torque sensor AT' of the adapter A6' feeds its signals to the data acquisition device DA.

Drive Lines

The drive line has resonance at one or more rates of rotation. By design of the fly wheel, the stiffness of components of the drive line especially shaft sections, and what are termed 'soft' components, and taking into account the adapters and the component under test, the drive line is designed to resonate at frequencies which do not coincide with the frequencies of the torque variations which the apparatus seeks to measure. Indeed, the drive lines are designed to have quiescent zones at those frequencies.

Torque Sensor AT', AT", BT, FIG. 17

The torque sensor of FIG. 17 is arranged on a shaft 100 of the test apparatus as indicated in FIGS. 1 to 3, 8, 10 or 12.

The sensor comprises an array 101 arranged on the shaft 100, normally on the outside of the shaft.

The sensor comprises an analogue signal processing path $P_A$ and a digital signal processing path $P_D$. The components of the paths $P_A$ and $P_D$ may be inside the shaft if it is hollow or on the outside of the shaft.

The analogue path $P_A$ is connected to an FM transmitter having at least an antenna 104 arranged on the outside of the shaft and which communicates with a corresponding receiver 105 of a stator arranged in proximity to the shaft 100. The digital path $P_D$ communicates with a receiver on the stator via an inductive coupling 108.

Power is supplied to the sensor by a power supply 1092 on/in the shaft energised by an AC source 109 coupled to it by an inductive coupling 1091.

Referring to FIG. 18, assuming the input drive line A of the test apparatus is applying a constant torque to the code D under test, the AC variation which is to be measured is a relatively small variation on the DC torque. For example the DC torque level may be 400 Nm and the AC variation ±0.5 Nm.

The analogue output signal of the array 101 is fed to an AC coupled amplifier 102 in the analogue path $P_A$. The amplified signal is filtered in a filter 103 which will be described in more detail below, and the filtered signal transmitted by the FM transmitter 104.

The analogue output signal of the array 101 is also fed to a DC coupled amplifier 106 in the digital path $P_D$. The amplified signal is fed to a processor 107 where it is converted to a digital sampled signal at a suitable sampling rate. The processor 107 also receives the filtered analogue signal from the analogue path and samples and digitises that. The processor 107 interleaves the digital samples of the two signals and feeds the resulting bit stream to the inductive coupling 108.

As described in the section "Drive Lines", a drive line resonates at one or more rates of rotation. The effect of such resonance may be regarded as signal noise. Other sources of signal noise are signal processing noise, and transmission noise associated with the FM transmitter/receiver 104/105 and the inductive coupling 108.

The drive line A, B, C is mechanically designed to be relatively quiescent, (not resonate) with a frequency band comprising the GMF at which torque measurement is to take place.

The filter 103 is designed to provide a pass band PB at the frequency band of interest and to attenuate outside that passband as shown schematically in FIG. 19.

The processor 107 in the digital path $P_D$ samples and digitises the signal output by the array 101 of strain gauges. It produces average values of DC torque by for example averaging a predetermined number of samples occurring in a window of samples.

The processor 107 also samples and digitises the filtered analogue signal.

The inductive coupling 108 couples the digital path $P_D$ to a receiver/processor 1081 which may have two outputs. The processor de-interleaves the samples on the bit stream and provides the averaged DC samples to a DC output for use in DC torque control as provided by sensor AT' in FIG. 11. The digital AC output is provided to the Data Acquisition device in parallel with the analogue output, for recording both digital and analogue AC outputs for the purpose of signal analysis to give a measure of the quality of the axle.

Modifications

The torque sensor AT' of FIG. 15 is for example positioned as shown at T in FIG. 3; that is between the intermediate bearing 12 and the spindle assembly 2. However, it may be placed elsewhere in the drive line between the flywheel 4 and the spindle assembly 2.

The spindle assembly 2 may be replaced by another bearing arrangement which supports the shaft of the drive line in a suitable manner. The bearing arrangement comprises ceramic rolling elements, i.e. balls or rollers, in one example. The bearing arrangement may comprise angular contact bearings.

In the examples of FIGS. 2 and 3, the components of the drive line are precision engineered to minimise torque variations due to the components of the drive line. Apart from the flywheel which is designed to provide high inertia, the other components are engineered to minimise inertia whilst also minimising resonance.

The test apparatus and the component have been described with reference to a component having an input shaft having a circular flange which engages with a corresponding coupling on the input drive line and having one or two outputs having splined bores for engaging with splined shaft(s) of one or two output drive lines. In an alternative arrangement the, or each, output of the component may comprise a circular flange as described above instead of a splined bore, in which case the output drive line has a corresponding coupling and is controlled to operate as described above to engage the engagement surfaces of the flange and coupling whilst maintaining the predetermined separation of the reference surfaces by the predetermined amount.

Test Procedures

The invention has been described by way of example to a test in which the output(s) of the axle are driven at constant speed whilst the torque applied to the input of the axle is varied. However other tests maybe performed as follows:

| POSSIBLE DRIVE CONDITIONS | | |
| --- | --- | --- |
| | OUTPUT(S) | INPUT(S) |
| 1 | Fixed Speed | Vary Torque |
| 2 | Vary Torque | Fixed Speed |
| 3 | Vary Speed | Fixed Torque |
| 4 | Fixed Torque | Vary Speed |
| 5 | Vary Speed | Vary Torque |
| 6 | Vary Torque | Vary Speed |

Tests can be run with a series of test steps using any combination of the above conditions in any order.

Thus the input and output drive lines are operable to apply one or more combinations of drive speed and torque to the component under test.

Components to be Tested

Whilst examples of the invention refer to testing axles containing differentials, other components containing gear arrangements could be tested, for example gear boxes, and transfer boxes for four-wheel drives amongst other examples.

In an example of another aspect of the invention, the torque sensor T which produces both AC and DC signal components representing torque variation is mounted on the adapter 6 as shown in FIG. 2. The processor P outputs data representing both DC and AC components of torque variation.

Whilst each of the drive lines are described as mounted on a slide, other forms of carriage may be used, for example a telescopic quill shaft, or linear rails.

Annex 1
Gear Mesh Frequency

When assessing the NVH quality of a component A is usual to quantify the Gear Mesh Frequency (GMF) rather than the rotational speeds of the input drive line A and output drive lines B and C. GMF is the number of times the teeth of gears of the component under test mesh.

Consider for example a reduction gear ratio of 4:1 in an axle under test. The input drive line rotates at 1500 rpm and the output drive lines rotate at 375 rpm.

If an input gear has 10 teeth, at 1500 rpm the GMF is (1500/60 revolutions per second)×(10 teeth)=250 Hz.

If the output gear has 40 teeth the GMF for it is (375/60)×40=250 Hz, confirming the teeth of the input gear and the output gear mesh at the same rate.

$$GMF = (RPM/60) \times teeth \text{ Hz}$$

$$RPM = (GMF \times 60)/teeth \text{ Revolutions per minute.}$$

The invention claimed is:

1. Apparatus for testing a component of a drive train of a vehicle, the apparatus comprising
   an output drive line for connection to an output of the component,
   an input drive line for connection to an input of the component,
   the input and output drive lines being operable to test the component with a predetermined combinations of drive speed and torque,
   wherein each of the input and output drive lines has a coupling for engaging with a corresponding coupling of the component and each of the drive lines is mounted for movement into and out of engagement with the component,
   the coupling of one of the input and output drive lines having a radially facing engagement surface and an axially facing reference surface, the engagement surface of the coupling of the drive line being for engaging with a corresponding radially facing engagement surface of the component the coupling of the component having an axially facing reference surface,
   and
   a controller arranged to move the said one of the drive lines towards the component so that the engagement surfaces of the coupling and component engage, with their reference surfaces spaced by a predetermined amount, and
   to initiate testing of the component whilst maintaining the said engagement and the said predetermined amount of spacing.

2. Apparatus according to claim 1 wherein the controller is arranged to move the coupling of the drive line into engagement with the said corresponding coupling of the component to bring the said reference surfaces being in abutment and then to move the coupling of the drive line away from abutment by the said predetermined amount.

3. Apparatus according to claim 2, wherein the coupling of the drive line has a support member defining the said reference surface and supporting a plurality of engagement members for engaging corresponding engagement parts of the said coupling of the component, the controller being arranged to sense abutment of the reference surfaces after the engagement members engage with the said corresponding engagement parts of the component.

4. Apparatus according to claim 2, wherein the controller is arranged to move the said one of the drive lines at a predetermined rate from a preset position, at which the coupling of the drive line is not engaged with the corresponding coupling of the component, to a further position in which the couplings of the drive line and component are engaged.

5. Apparatus according to claim 4, wherein the controller is arranged to move the drive line at a rate higher than said predetermined rate from a reference position towards the component up to the said preset position.

6. Apparatus according to claim 1, wherein the said coupling is on the input drive line.

7. Apparatus according to claim 1, wherein the said coupling is on the output drive line.

8. Apparatus according to claim 1, comprising a sensor for sensing the distance between the reference surface of the drive line and the reference surface of the component, the controller being arranged to respond to the sensed distance to bring the reference surface of the coupling of the drive line to a position spaced from the reference surface of the component by the said predetermined amount.

9. Apparatus according to claim 1, further comprising a support for supporting the component in a predetermined position relative to the drive line and a sensor on the support for sensing the position of the reference surface of the component relative to the support, the controller being arranged to respond to the sensed distance to bring the reference surface of the coupling of the drive line to a position spaced from the reference surface of the component by the said predetermined amount.

10. Apparatus for testing a component of a drive train of a vehicle, the apparatus comprising
    an output drive line for connection to an output of the component,
    an input drive line for connection to an input of the component,
    the input and output drive lines being operable to test the component with a predetermined combination of drive speed and torque,
    wherein each of the input and output drive lines has a coupling for engaging with a corresponding coupling of the component and each of the drive lines is mounted for movement into and out of engagement with the component,
    the coupling of one of the input and output drive lines having a radially facing engagement surface and an axially facing reference surface, the engagement surface of the coupling of the drive line being for engaging with a corresponding radially facing engagement surface of the component the coupling of the component having an axially facing reference surface, and
    a controller arranged to move the said one of the drive lines towards the component so that the engagement surfaces of the coupling and component engage, and substantially zero axial force is applied to the component and
    to initiate testing of the component whilst maintaining the said engagement and substantially zero axial force is applied to the component.

11. A method of testing a component of a drive train of a vehicle, using a test apparatus comprising
    an output drive line for connection to an output of the component,
    an input drive line for connection to an input of the component,
    the input and output drive lines being operable to test the component with a predetermined combination of drive speed and torque,
    wherein each of the input and output drive lines has a coupling for engaging with a corresponding coupling of the component and each of the drive lines is mounted for movement into and out of engagement with the component, the coupling of one of the input and output drive lines having a radially facing engagement surface and an axially facing reference surface, the engagement surface of the coupling of the drive line being for engaging with a corresponding radially facing engagement surface of the component the coupling of the component having an axially facing reference surface, the method comprising, moving the said one of the drive lines towards the component so that the engagement surfaces of the couplings of the drive line and component engage, with their reference surfaces spaced by a predetermined amount, testing of the component whilst maintaining the said engagement and the said predetermined amount of spacing, and moving the input drive line towards the component so that the reference surface of the coupling of the drive line moves into engagement with, and abuts, the corresponding reference surface of the component and then moving the drive line away from abutment by the said predetermined amount whilst maintaining the said engagement, and testing the component whilst maintaining the said engagement and predetermined spacing.

12. A method of testing a component of a drive train of a vehicle, using a test apparatus comprising an output drive line for connection to an output of the component, an input drive line for connection to an input of the component, the input and output drive lines being operable to test the component with a predetermined combination of drive speed and torque, wherein each of the input and output drive lines has a coupling for engaging with a corresponding coupling of the component and each of the drive lines is mounted for movement into and out of engagement with the component, the coupling of one of the input and output drive lines having a radially facing engagement surface and an axially facing reference surface, the engagement surface of the coupling of the drive line being for engaging with a corresponding radially facing engagement surface of the component the coupling of the component having an axially facing reference surface, the method comprising, moving the said one of the drive lines towards the component so that the engagement surfaces of the couplings of the drive line and component engage, with their reference surfaces spaced by a predetermined amount, testing of the component whilst maintaining the said engagement and the said predetermined amount of spacing, and measuring the distance from the reference surface of the drive line to the reference surface of the component and controlling movement of the said one of the drive lines towards the component in dependence on the measured distance so that the engagement surfaces of the couplings of the drive line and component engage, with their reference surfaces spaced by a predetermined amount.

13. A method of testing a component of a drive train of a vehicle, using a test apparatus comprising an output drive line for connection to an output of the component, an input drive line for connection to an input of the component, the input and output drive lines being operable to test the component with a predetermined combination of drive speed and torque, wherein each of the input and output drive lines has a coupling for engaging with a corresponding coupling of the component and each of the drive lines is mounted for movement into and out of engagement with the component, the coupling of one of the input and output drive lines having a radially facing engagement surface and an axially facing reference surface, the engagement surface of the coupling of the drive line being for engaging with a corresponding radially facing engagement surface of the component the coupling of the component having an axially facing reference surface, the method comprising, moving the said one of the drive lines towards the component so that the engagement surfaces of the couplings of the drive line and component engage, with their reference surfaces spaced by a predetermined amount, testing of the component whilst maintaining the said engagement and the said predetermined amount of spacing, and measuring the distance from the reference surface of the component to a reference position on a support of that component, which reference position is at a preset spacing from a reference position of the drive line and controlling movement of the drive line towards the component in dependence on the measured distance so that the engagement surfaces of the couplings of the drive line and component engage, with their reference surfaces spaced by a predetermined amount.

14. A method of testing a component of a drive train of a vehicle, using a test apparatus comprising an output drive line for connection to an output of the component, an input drive line for connection to an input of the component, the input and output drive lines being operable to test the component with a predetermined combination of drive speed and torque, wherein each of the input and output drive lines has a coupling for engaging with a corresponding coupling of the component and each of the drive lines is mounted for movement into and out of engagement with the component, the coupling of one of the input and output drive lines having a radially facing engagement surface and an axially facing reference surface, the engagement surface of the coupling of the drive line being for engaging with a corresponding radially facing engagement surface of the component the coupling of the component having an axially facing reference surface, the method comprising, moving the said one of the drive lines towards the component so that the engagement surfaces of the couplings of the drive line and component engage, with their reference surfaces spaced by a predetermined amount, testing of the component whilst maintaining the said engagement and the said predetermined amount of spacing, and testing a component with different values of spacing of the reference surfaces of the coupling and component to determine empirically the optimum spacing which provides consistent test results and using the empirically determined value as the said predetermined amount.

* * * * *